United States Patent [19]

Kress

[11] Patent Number: 4,726,545
[45] Date of Patent: Feb. 23, 1988

[54] VTOL AIRCRAFT HAVING COMBINATION LIFT AND LIFT/CRUISE ENGINES

[75] Inventor: Robert W. Kress, Lloyd Harbor, N.Y.

[73] Assignee: Grumman Aerospace Corporation, Bethpage, N.Y.

[21] Appl. No.: 936,862

[22] Filed: Dec. 2, 1986

[51] Int. Cl.⁴ .................. B64C 15/02; B64C 29/00
[52] U.S. Cl. .................. 244/12.3; 244/23 B; 244/52; 244/23 D; 244/12.5
[58] Field of Search ......... 244/17.11, 17.17, 7 R, 244/7 A, 6, 12.1, 23 R, 23 B, 12.3, 52, 23 D, 12.5, 12.4, 45 A

[56] References Cited

U.S. PATENT DOCUMENTS

| | | | |
|---|---|---|---|
| D. 271,485 | 11/1983 | Tucson | 244/45 A |
| 1,667,002 | 4/1928 | Hall | 244/12.3 |
| 2,943,815 | 7/1960 | Besson | 244/14 |
| 3,042,342 | 7/1962 | Wiles et al. | 244/23 B |
| 3,064,419 | 11/1962 | Ward | 244/52 |
| 3,084,888 | 4/1963 | Hertel | 244/23 B |
| 3,157,373 | 11/1964 | May et al. | 244/23 B |
| 3,260,476 | 7/1966 | James | 244/7 R |
| 3,289,980 | 12/1966 | Hill | 244/56 |
| 3,310,260 | 3/1967 | Chichester-Mills | 244/12.5 |
| 3,327,482 | 6/1967 | Pike | 244/23 D |
| 3,387,456 | 6/1968 | Feder et al. | 244/23 B |
| 3,388,878 | 6/1968 | Peterson et al. | 244/23 B |
| 3,460,783 | 8/1969 | Haberkorn | 244/56 |
| 3,502,286 | 3/1970 | Warren | 244/17.17 |
| 3,638,884 | 2/1972 | Timperman | 244/12.3 |
| 3,739,580 | 6/1973 | Bland et al. | 244/23 B |
| 3,801,048 | 4/1974 | Riccius | 244/23 B |
| 3,972,490 | 8/1976 | Zimmermann et al. | 244/12.3 |
| 4,022,403 | 5/1977 | Chiquet | 244/46 |
| 4,296,896 | 10/1981 | Kress et al. | 244/12.4 |
| 4,410,151 | 10/1983 | Hoppner et al. | 244/14 |
| 4,482,109 | 11/1984 | duPont | 244/23 D |

FOREIGN PATENT DOCUMENTS 806030 12/1958 United Kingdom ............... 244/12.3

OTHER PUBLICATIONS

"Grumman Studying RPV Concept for Naval Fleet Surveillance", *Aviation Week & Space Technology*, Aug. 4, 1986.

Primary Examiner—Galen Barefoot
Attorney, Agent, or Firm—Pollock, VandeSande & Priddy

[57] ABSTRACT

By mounting a lift engine and a lift/cruise engine closely to the center of gravity of an aircraft and by orienting the respective engines such that the thrust axes thereof are arranged for ensuring that the vector sum of the lift engine thrust and the lift/cruise engine thrust pass through the center of gravity at all times, a fuel efficient aircraft can controllably takeoff and land vertically. To provide for vectoring the thrust of the respective engines, different nozzles are provided. Further, to provide for pitch, roll and yaw control, a vane assembly is coupled to the aircraft in such a way that it remains in alignment to the jet stream of the lift engine.

17 Claims, 6 Drawing Figures

VTOL AIRCRAFT HAVING COMBINATION LIFT AND LIFT/CRUISE ENGINES

FIELD OF THE INVENTION

The present invention relates to vertical takeoff and landing aircraft, and more particularly to an aircraft having a combination of lift and lift/cruise engines with vectorable thrust.

BACKGROUND OF THE INVENTION

Conventional vertical takeoff and landing aircraft (VTOL) usually include engines which are mounted at the sides of the fuselage or the underside of the wings. There are VTOL's having engines which can be pivoted about the pitch axis or about an axis parallel to the pitch axis for vertical takeoffs. Examples of this type of aircraft include U.S. Pat. Nos. 3,388,878 and 3,084,888. In U.S. Pat. No. 3,084,888 a VTOL aircraft having lifting jets which can be swiveled from within the fuselage to longitudinal sides thereof for vertically lifting the aircraft is disclosed. After having vertically lifted off, the lift jets are returned within the fuselage and different jets are used for the horizontal flight. Similarly, the VTOL aircraft of U.S. Pat. No. 3,388,878 utilizes movable vertical lift-off engines which are used strictly for vertical lift-offs.

VTOL aircraft using both vertical lift-off engines and cruise engines are also known. Examples of this type of VTOL aircraft include U.S. Pat. Nos. 3,042,342, 3,972,490, 3,460,783 and 3,387,456. In U.S. Pat. No. 3,042,342, four small gas turbine engines are positioned in the midsection of the aircraft for providing the vertical lift thrust, while a cruise engine is mounted to the aft section of the aircraft. In U.S. Pat. No. 3,972,490, two turbines and three high bypass turbotip fans are disposed in the fuselage of the aircraft to produce vertical lift and cruise for the same. One of the turbotip fans is located in the fore section of the aircraft while the remaining two turbotip fans are situated in the aft section of the aircraft. Likewise, in U.S. Pat. No. 3,387,456, vertical lift engines are shown to be situated in the front and midsection of the aircraft while cruise engines are located in the aft section of the same. In U.S. Pat. No. 3,460,783, a VTOL aircraft having front rotatable parallel engines adjacent to opposite sides of the fuselage for providing thrust for vertical lift-offs and cruising is disclosed. Further disclosed in U.S. Pat. No. 3,460,783 are fixed stern engines which, together with afterburners and deflection exhaust pipes, are used for maintaining control of the aircraft during vertical lift-offs. The U.S. Pat. No. 3,460,783 reference teaches that by using both the stern engines and the front rotatable engines, the control of the aircraft is maintained during lift-offs. Both the front rotatable engines and the stern engines are fully utilized for balancing the moments of the aircraft about its pitch axis. Needless to say, a large amount of fuel has to be expended during vertical lift-offs by the U.S. Pat. No. 3,460,783 aircraft, as no interactive thrust or interaction between the exhaust from the front and stern engines is provided.

SUMMARY OF THE PRESENT INVENTION

In contrast to the prior art, the present invention aircraft utilizes a combination of lift and lift/cruise engines, both of which are located close to the center of gravity of the aircraft. The thrust axes for the thrusts generated by the respective engines interact such that the vector sum of the thrusts would, at all times, pass through the center of gravity, thereby providing trim control during both vertical takeoffs and landings of the aircraft. Cruciform airfoils located in the exhaust of the lift engine and a plurality of swiveling-nozzle reaction jets are used to control the pitch, roll and yaw of the aircraft.

To reduce the gust susceptibility of the aircraft during landings and takeoffs, the wings of the aircraft may be swept back along the fuselage. Likewise, the wings are fully swept back when the aircraft is to be stowed.

Pitch control in conventional flight is provided by an elevator on the horizontal tail, and yaw control by rudders on inverted vertical fins. Wing spoilers are used for conventional flight roll control.

Since only a minimal amount of fuel is consumed by the lift/cruise engine of this aircraft in conventional flight, this aircraft has a large payload capability with long endurance. While the lift engine burns a lot of fuel per second, it is only used for a short time during takeoff and landing. Further, it is a very light engine and does not affect the payload significantly. Because the aircraft has long endurance—due to its frugal fuel consumption, it can be—when fitted with appropriate supportive electronics—used as a long endurance/range remotely controlled drone.

The above-mentioned object and advantages of the present invention will be more clearly understood when considered in conjunction with the accompanying drawings, in which:

DETAILED DESCRIPTION OF THE INVENTION

Figure 1:
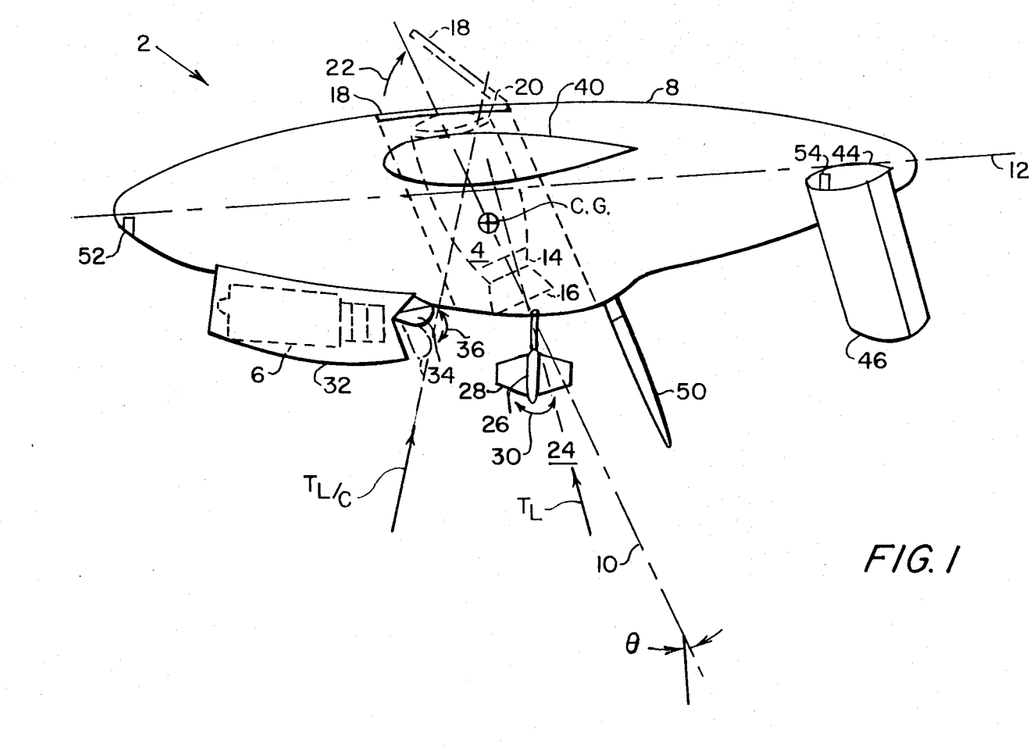
FIG. 1 is a cross-sectional view of the present invention aircraft.
Figure 2:
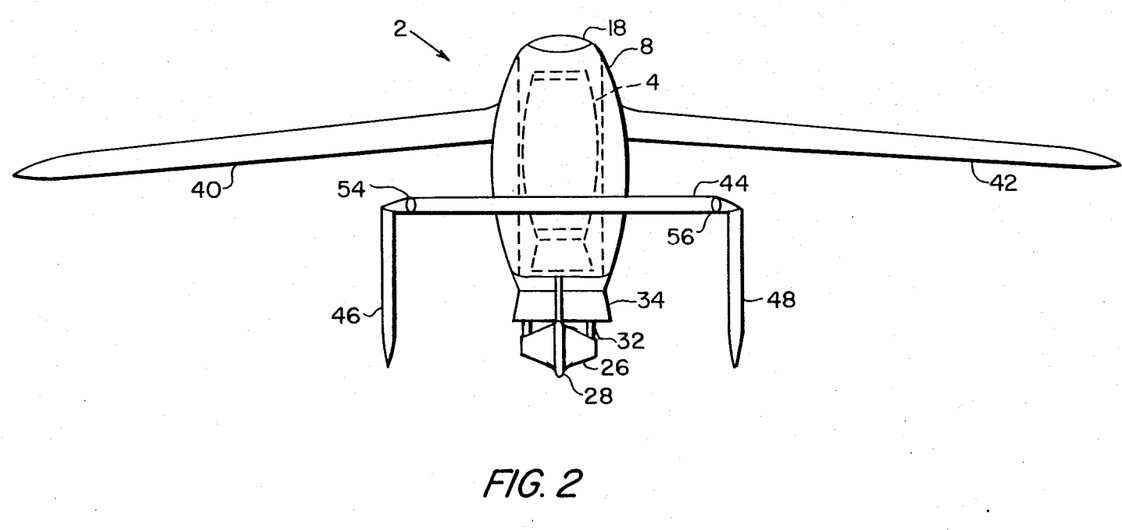
FIG. 2 is an end view of the FIG. 1 aircraft.
Figure 3:
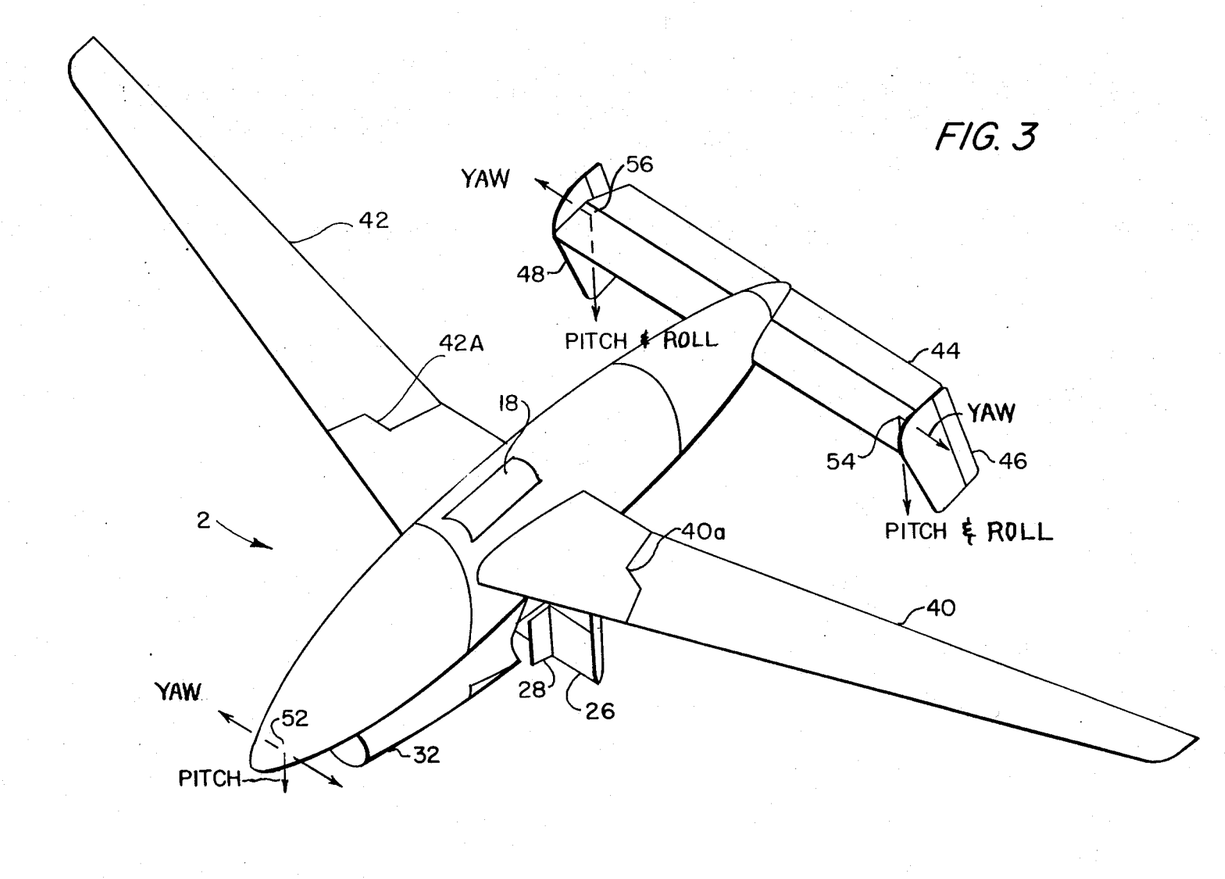
FIG. 3 is a perspective view of the present invention aircraft.

Looking at FIGS. 1 to 3, a present invention aircraft 2 includes a lift engine 4 and a lift/cruise engine 6 mounted within and underneath, respectively, fuselage 8. Lift engine 4 is fixed along an axis 10 which is obliquely transverse to a longitudinal axis 12. Axis 10 is offset from a transverse axis (from longitudinal axis 12 and not shown) by an angle $\Theta$, which for this embodiment may be 20°. Lift engine 4 may be selected from a host of conventional engines which may include, for example, the Rolls Royce XJ99 engine. This engine has a very high thrust to weight ratio, i.e., approximately 20 to 1; and it produces a lift thrust represented by line vector $T_L$. Connected to aft section 14 of lift engine 4 is a swivel nozzle 16, which can pivot, for this embodiment, approximately ±15° about axis 10, i.e., the lift engine thrust represented by $T_L$ is vectorable around axis 10. Accordingly, nozzle 16 is capable of vectoring the thrust produced by engine 4 ±15° with respect to its own axis. Of course, it should be noted that lift engine 4 is fixedly mounted within fuselage 8. A cover or door 18 is provided on top of the fuselage in alignment with an air intake 20 of engine 4. Door 18 can be moved in the direction as shown by arrow 22 such that it can act as a scoop for providing air to engine 4.

Hinged on the underside of fuselage 8 is a cruciform airfoil or vane assembly 24 which includes rotatable horizontal vanes 26 and rotatable vertical vanes 28. As illustrated by arrow 30, vane assembly 24 can be pivoted such that it remains aligned within the jet stream (or fan blast) produced by engine 4. As best seen in FIG. 1, both horizontal and vertical vanes 26, 28 are located below the center of gravity (C.G.) of the aircraft. When horizontal vanes 26 are moved within the jet stream of lift engine 4, lift forces below the center of gravity (C.G.) are produced, in turn generating pitch control. Similarly, vertical vanes 28 produce roll control for aircraft 2.

As was mentioned previously, lift/cruise engine 6 is mounted horizontally under fuselage 8. It is enclosed within a nacelle 32. Lift/cruise engine 6 is a very high cruise efficiency turbofan engine with a high bypass ratio. Its efficiency is further enhanced, since it runs at maximum throttle at all times. Such an engine may be a Garrett F-109 engine. Pivotably mounted to the end portion of nacelle 32 is a scoop-like turning or vectoring nozzle 34, which is pivotable along the direction shown by arrow 36. By pivoting nozzle 34 downward, the thrust produced by engine 6, which is represented by line vector $T_{L/C}$, may be vectored 90° for takeoff and landing. It should be noted that thrust axis $T_{L/C}$ combines vectorially with the lift engine thrust axis $T_L$ to effect in balanced pitching moments about the C.G.

A pair of pivotable wings 40 and 42 are mountd to the respective sides of fuselage 8. These wings, best shown in FIGS. 2 and 3, may be fully swept backwards lengthwise alongside fuselage 8 from hinges 40A and 42A. See FIG. 4. The instances for which the wings are swept back will be discussed in conjunction with the operation of the aircraft.

To provide for yaw control, the empennage of the aircraft is formed by a horizontal stabilizer with stabilizer/elevator 44 and two inverted fins and rudders 46 and 48 coupled at opposite longitudinal ends thereof. The rudders are oriented transversely to the longitudinal axis of the elevator and are directed downwardly from the horizontal plane of elevator 44. This empennage configuration provides for optimal pitch and yaw control for the aircraft in conventional flight. For conventional flight roll control, wing spoilers 49 are used. See FIG. 4.

Looking at FIG. 1, there is shown a harpoon 50 which is connected to the underside of fuselage 8. This harpoon is used for securing the aircraft onto the landing/recovery pad of a ship, to be discussed in conjunction with FIG. 5.

To provide for additional pitch, roll and yaw control, three swiveling-nozzle reaction jets are added to the fore and aft sections of aircraft 2. Represented by 52 at the nose section of aircraft 2 and 54, 56 at stabilizer/elevator 44 in the aft section of aircraft 2, these reaction jets (RCS) utilize air bled from the compressor of engine 4, i.e., engine 4 bleed air, to provide for additional yaw, pitch and roll control. As best seen in FIG. 3, by modulating the flow of the RCS jets from left to right, additional roll control may be obtained. Likewise, by modulating the RCS jets forward and aft, additional pitch control of the aircraft may be obtained. And if the nose and tail jets are swiveled from left to right, yaw control is garnered. Since these RCS jets are conventional, no attempt has been made to feature the valves needed to change the flow therefrom.

Also, it should be appreciated that the means for pivoting wings 40 and 42, for moving vane assembly 24, swivel nozzle 16 and vectoring nozzle 34 are all conventional and are done, for example, by hydraulic pistons, pumps, levers and screws which are not shown for the sake of simplicity.

Figure 4:
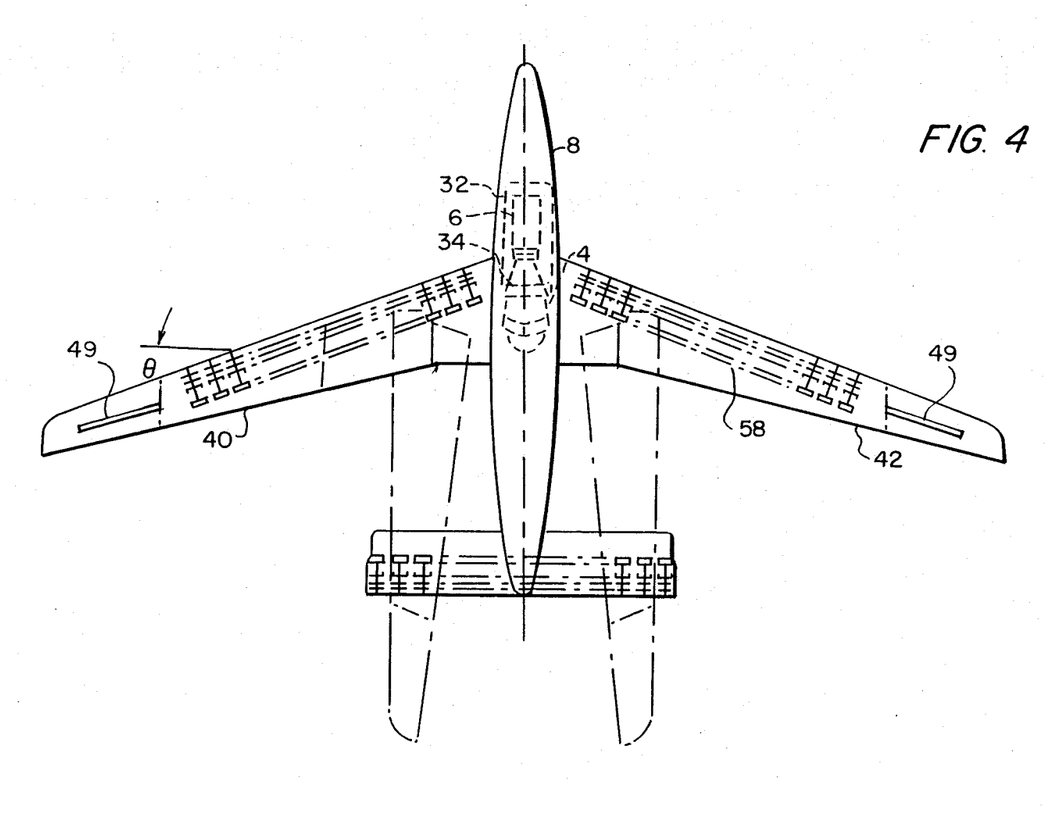
FIG. 4 shows a plan view of the present invention aircraft.

Referring now to FIG. 4, it can be seen that aircraft 2 has equipped at the front portions of wings 40 and 42, as well as at the rear portion of elevator 44, sets of conformal radars 58. As shown in FIG. 4, the aircraft is in a cruise position, with its wings unswept. It should be noted that these wings are swept back slightly at an angle $\phi$, which for this embodiment, is about 20°. This slight swept back configuration allows the conformal radar to observe 20° more at each side of the aircraft.

In operation, for vertical takeoffs and landings, both lift engine 4 and lift/cruise engine 6 would operate. In the instance of vertical takeoff, door 18 is extended to the open position to provide air for engine 4. To accelerate forward, since lift engine is oriented approximately 20° from an axis perpendicular to longitudinal axis 12, nozzle 16 is swiveled slightly aftward, within ±15°, so as to vector the thrust produced by engine 4 forward for takeoff. At the same time, reverser nozzle 34 for lift/cruise engine 6 is rotated upward, thereby changing the vectoring of the thrust produced by engines 4 and 6 from vertical against the gravitational pull of the earth at takeoff to produce forward directed force. For this embodiment, since engine 4 is a jet engine and engine 6 is a turbofan engine, about 85% of the thrust required to vertically lift aircraft 2 comes from the lift engine 4. As shown in FIG.1, since engines 4 and 6 are mounted in proximate location to the center of gravity of the aircraft and the thrust axes are arranged such that, during the vertical movement and hovering of the aircraft the vector sum of the lift engine thrust and the lift/cruise engine thrust pass through the center of gravity. In other words, the thrust axes are arranged such that there is zero net moment in pitch.

To maintain this equilibrium during the vertical takeoff, nozzle 16 is gradually swiveled toward the aft section of the aircraft while nozzle 34 gradually pivots toward the underside of fuselage 8. Moreover, vane assembly 24 is continuously maintained within alignment of the jet blast from engine 4, with horizontal and vertical vanes 26 and 28 rotating to provide for pitch and roll controls, respectively. Of course, RCS jets 52, 54 and 56 are likewise operating during this vertical lift-off to provide for additional control for the three axes of movement. To eliminate as much as possible wind gusts from affecting the vertical takeoff, wings 40 and 42 are swept back alongside fuselage 8, as shown in FIG.4 by the dashed lined wings.

To descend, lift/cruise engine 6 is throttled down to low altitude—until time for vertical landing, at which point it is throttled back up to full power. When landing, the opposite maneuver to vertical takeoff takes place. That is, nozzle 16 is swiveled forwards while nozzle 34 is gradually moved away from the underside of fuselage 8 to provide deceleration for landing. Likewise, the RCS jets and the vane assembly are set into operation such that additional controls are provided. For the sake of simplicity, the landing gear is not shown in any of the figures.

When the aircraft has been vertically lifted and accelerated forward to the speed for wing-borne flight, lift engine 4 is turned off and cover 18 is retracted. As the acceleration proceeds, the wings 40 and 42 are unswept so that the lift for the aircraft is produced wholly by the wings, i.e., wing-borne. Approximately 85% of the lift thrust is gained from lift engine 4. Thus, the aircraft becomes a very fuel efficient cruise plane, since lift/cruise engine is so small and runs always at full throttle in cruise. In effect, it becomes a powered glider with excellent cruise and endurance characteristics.

Figure 5:
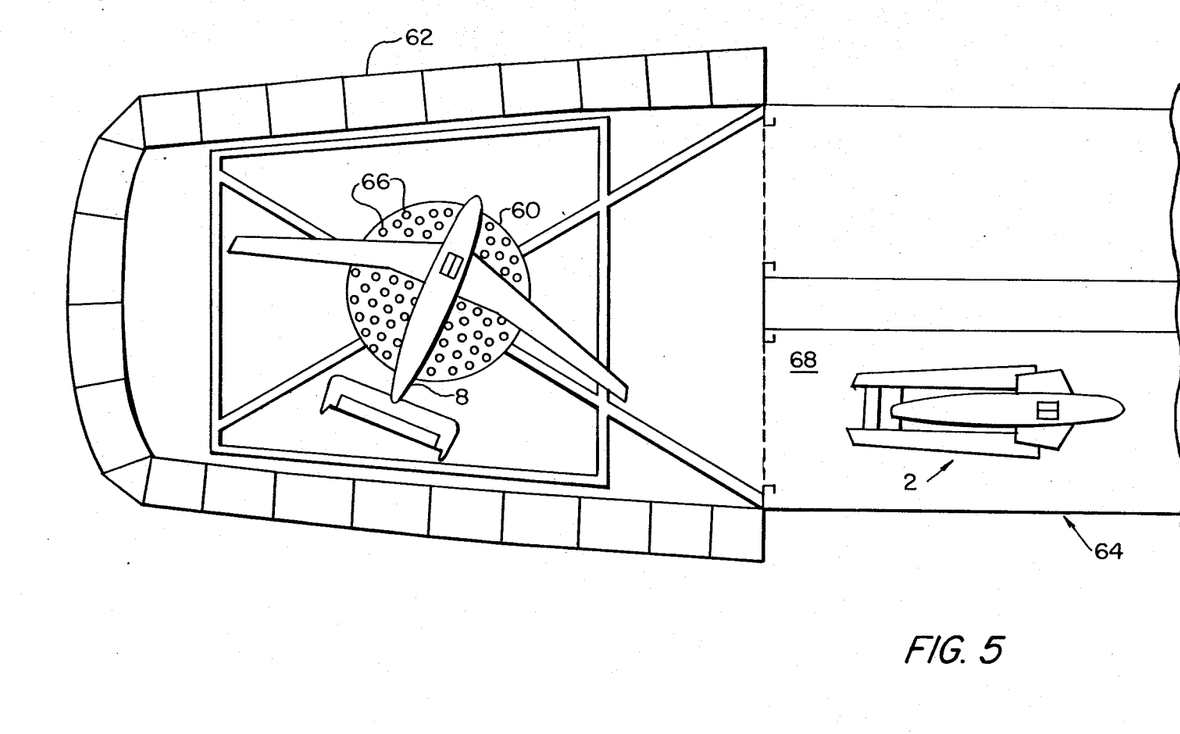
FIG. 5 shows a plan view of present invention aircraft anchored to a ship and stowed in a hanger thereof.

To land, aside from operating nozzles 16, 34, and vane assembly 24 as described hereinbefore for decelerating the aircraft, the harpoon 50 is used for a shipboard landing. Referring to FIG. 5, there is seen a circular flat metal platform 66 on deck 62 of ship 64. Platform 60 is pierced with a large number of holes 66. As the aircraft 2 touches down, harpoon 50 becomes engaged with one of the holes of 66, thereby anchoring the aircraft to the deck of the ship. Looking now at the right hand portion of FIG. 5, a present invention aircraft, having its wings fully swept back, is seen in stowage in hanger 68. Multiple aircraft can be stowed in one hanger, since they are smaller than the helicopter for which the hangers are designed.

Since the present invention aircraft is extremely fuel efficient, it can be put to good use as a remotely controlled drone for reconnaissance purposes.

Figure 6:
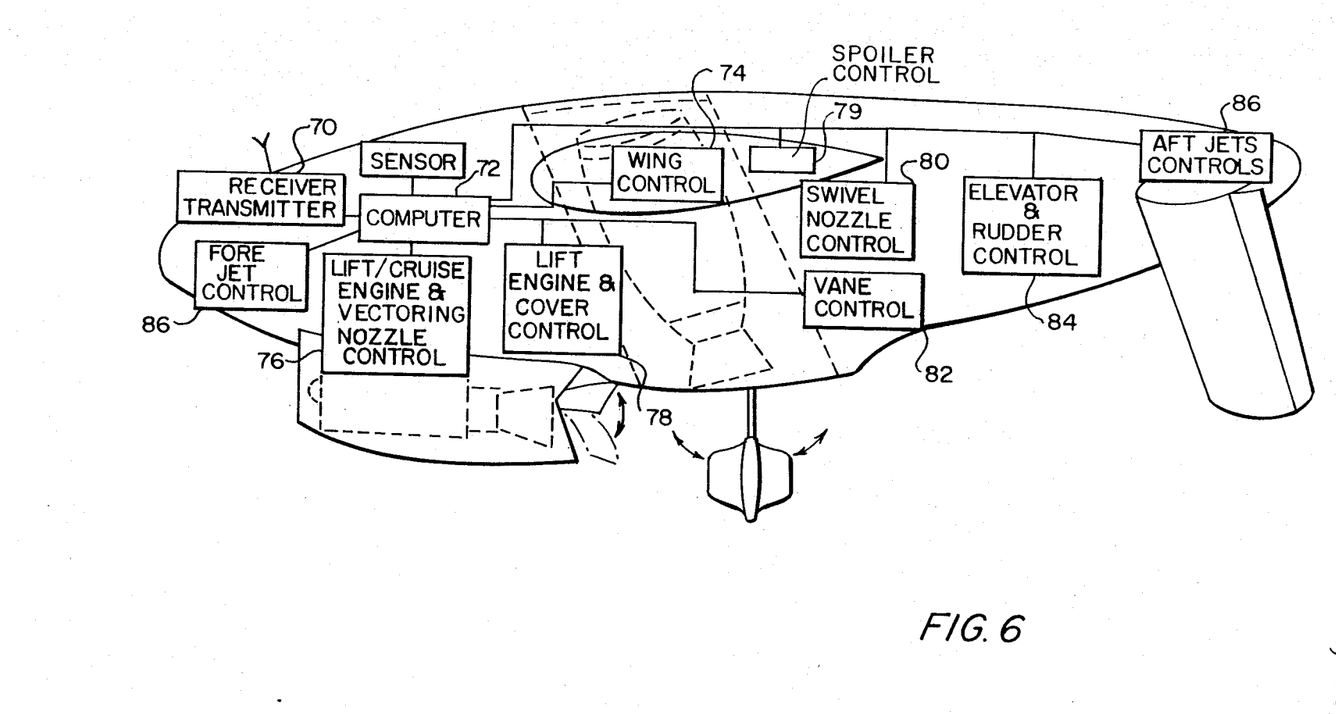
FIG. 6 is a block diagram showing a remotely controlled present invention aircraft.

Remote control of an aircraft is well known. For example, referring now to FIG. 6, a receiver 70 installed for receiving instructions and commands from an off board transceiver means (not shown) is seen. Inertial navigation means are also in the drone. Transmitted commands are combined with the inertial information and are sent to a computer 72, which in turn routes the commands to the wing controls 74, lift/cruise engine and vectoring nozzle control 76, lift engine and cover control 78, spoiler control 79, swivel nozzle control 80, vane assembly control 82, elevator and rudder control 84 and respective jet controls 86. Commands from the computer to these controls, and the subsequent controlling of the hydraulic/mechanical controls by the respective controls, are well known and will not be discussed herein. Targets detected by either the conformal radar or some other sensing means are sent via an onboard transceiver to the drone command (or other) station.

Having thus described the present invention, it should be appreciated that inasmuch as the present invention is subject to many variations, modifications and changes in detail, it is intended that all matters described throughout this specification and shown in the accompanying drawings be interpreted as illustrative only and ont in a limiting sense. Accordingly, it is intended that the invention be limited only by the spirit and scope of the appended claims.

I claim:

1. A vehicle having a fuselage, comprising:
   a first engine mounted coaxially along an axis transversely oblique to the longitudinal axis of the fuselage for producing a first thrust;
   first movable means for vectoring the first thrust about at least two axes with respect to the transversely oblique axis;
   a second engine mounted in front of the first engine in a parallel relationship to the longitudinal axis for producing a second thrust;
   second movable means for vectoring the second thrust;
   wherein exhausts from the first and second engines interact such that the vector sum of the first and second thrusts passes through the center of gravity of the vehicle during its vertical movement, thereby controllably moving the vehicle verticlly.

2. The vehicle according the claim 1, further comprising:
   airfoil means movably mounted to the fuselage and in alignment to the jet stream produced by the first engine, the airfoil means including:
   first rotatable means interacting with the jet stream for providing pitch control for the vehicle;
   second rotatable means interacting with the jet stream for providing roll control for the vehicle.

3. The vehicle according the claim 1, further comprising:
   a pair of wings pivotably mounted in parallel to the longitudinal plane of the fuselage at opposite sides thereof, the wings pivotable to first and second positions;
   whereby the wings are pivoted to the first position for reducing wind disturbances to the vehicle during the vertical movement thereof.

4. The vehicle according to claim 1, further comprising:
   cover means retractably mounted on top of the fuselage and concentrically positioned above an air intake of the first engine;
   wherein air is provided to the first engine when the cover means is extended to an open position.

5. The vehicle according to claim 3, further comprising:
   an elevator connected to an aft position of the vehicle for pitch control, the elevator having connected at longitudinal opposite ends thereof inverted rudders, the rudders being transversely oriented to the longitudinal axis of the elevator for providing yaw control for the vehicle.

6. The vehicle according to claim 5, further comprising:
   a first jet located at a fore portion of the vehicle and second and third jets located at opposite ends of the elevator for providing pitch, roll and yaw controls for the vehicle.

7. The vehicle according to claim 6, further comprising:
   means connected to the fuselage of the vehicle for securing the same to a launching and recovery pad.

8. The vehicle according to claim 2, further comprising:
   means for receiving flight instructions and commands from remote transceiver means for navigating and operating the vehicle.

9. The vehicle according to claim 1, wherein the first thrust vectoring means comprises a swiveled nozzle; and
   wherein the second thrust vectoring means comprises a hooded reverser nozzle.

10. The vehicle according to claim 1, wherein the first engine is a jet engine; and wherein the second engine is a turbofan engine.

11. The vehicle according to claim 10, wherein the first engine is turned off and the second engine operates at maximum throttle; and wherein the second thrust vectoring means vectors the second thrust substantially parallel to the longitudinal axis of the vehicle when the vehicle is cruising.

12. An aircraft having a fuselage, comprising:
   a first engine mounted coaxially along an axis transversely oblique to the longitudinal axis of the fuselage for producing a first thrust along a first thrust axis;
   a second engine mounted in front of the first engine in a parallel relationship to the longitudinal axis for producing a second thrust along a second thrust axis;
   a swivel nozzle engaged to the output of the first engine for vectoring the first thrust about at least two axes with respect to the first thrust axis against gravitational forces of the earth;
   a movable vectoring nozzle engaged to the output of the second engine for vectoring the second thrust to interact with the first thrust;
   wherein exhausts from the first and second engines interact for arranging the thrust axes to produce zero net moment in pitch during vertical takeoffs, landings and hovering of the aircraft.

13. The aircraft according to claim 12, further comprising:
   airfoil means movable mounted to the fuselage and in alignment to the jet stream produced by the first engine, the airfoil means including:
   first rotatable means interacting with the jet stream for providing pitch control for the aircraft;
   second rotatable means interacting with the jet stream for providing roll control for the aircraft.

14. The aircraft according to claim 13, further comprising:
   a pair of wings pivotably mounted to the longitudinal plane of the fuselage at opposite sides thereof, the wings pivotable to first and second positions;
   whereby the wings are pivoted to the first position for reducing wind disturbances to the aircraft during vertical movement thereof; and
   whereby the wings are pivoted to the second positon for cruising.

15. The aircraft according to claim 14, further comprising:
   an elevator connected to an aft portion of the aircraft for pitch control, the elevator having connected at longitudinal opposite ends thereof inverted rudders, the rudders being transversely oriented to the longitudinal axis of the elevator for providing yaw control for the aircraft.

16. The aircraft according to claim 15, further comprising:
   a first jet located at the nose portion of the aircraft and two jets located at opposite ends of the elevator for providing pitch, roll and yaw control for the aircraft.

17. The aircraft according to claim 12, wherein, when the aircraft is to cruise, the first engine is turned off and the second engine operates at maximum throttle; and
   wherein the reverser nozzle is moved to vector the second thrust substantially parallel to the longitudinal axis.

* * * * *

UNITED STATES PATENT AND TRADEMARK OFFICE
CERTIFICATE OF CORRECTION

PATENT NO. : 4,726,545

DATED : February 23, 1988

INVENTOR(S) : Robert W. Kress

It is certified that error appears in the above-identified patent and that said Letters Patent is hereby corrected as shown below:

Column 5, line 54, change "ont" to --not--.

Column 6, line 7, change "verticlly" to --vertically--.

Column 7, line 25, change "movable" to --movably--.

Column 8, line 9, change "positon" to --position--.

Signed and Sealed this

Twelfth Day of July, 1988

Attest:

DONALD J. QUIGG

Attesting Officer

Commissioner of Patents and Trademarks